United States Patent [19]

Coker et al.

[11] Patent Number: 5,426,541
[45] Date of Patent: Jun. 20, 1995

[54] SELF-EQUALIZATION METHOD FOR PARTIAL-RESPONSE MAXIMUM-LIKELIHOOD DISK DRIVE SYSTEMS

[75] Inventors: Jonathan D. Coker; Richard L. Galbraith, both of Rochester, Minn.; Walter Hirt, Zurich, Switzerland; David J. Stanek; Mark D. Warne, both of Rochester, Minn.

[73] Assignee: International Business Machines Corporation, Armonk, N.Y.

[21] Appl. No.: 221,321

[22] Filed: Mar. 31, 1994

[51] Int. Cl.⁶ .............................................. G11B 5/09
[52] U.S. Cl. ........................................ 360/65; 360/46
[58] Field of Search ........................... 360/45, 46, 65; 333/28 R, 18, 10; 375/11, 1 D, 14

[56] References Cited

U.S. PATENT DOCUMENTS

| | | | |
|---|---|---|---|
| 3,708,766 | 1/1973 | Sha et al. | 333/1 B |
| 4,227,160 | 10/1980 | Tamori et la. | 333/1 B |
| 4,376,308 | 3/1983 | McNair | 375/14 |
| 4,821,125 | 4/1989 | Christensen et al. | 360/46 |
| 4,910,779 | 3/1990 | Cooper et al. | 318/86 |
| 4,945,538 | 7/1990 | Patel | 371/43 |
| 4,975,954 | 12/1990 | Cooper et al. | 381/26 |
| 4,979,055 | 12/1990 | Squires et al. | 360/69 |
| 5,060,088 | 10/1991 | Dolivo et al. | 360/46 |
| 5,084,791 | 1/1992 | Thanos et al. | 360/15 |
| 5,146,369 | 9/1992 | Yamaguchi | 360/77.4 |
| 5,227,930 | 7/1993 | Thanos et al. | 360/48 |
| 5,255,131 | 10/1993 | Coker et al. | 360/48 |
| 5,255,136 | 10/1993 | Machado et al. | 360/77.02 |
| 5,258,940 | 11/1993 | Coker et al. | 364/724.16 |
| 5,268,848 | 12/1993 | Coker et al. | 364/724.19 |

OTHER PUBLICATIONS

D. D. Falconer, Lennart Ljong, "Application of Fask Kalman Estimation to Adaptive Equalization", IEEE Transactions on Comm. vol. 26, 1439–1446 Oct. 1978.

Mita et al., "Adaptive Equalization Techniques for Digital Video Recording System", SMPTE Journal, pp. 1–5, Jan. 1988.

Falconer et al. "Least Sum of Squared Errors (LSSE) Channel Estimation", IEEE Proceedings-F vol. 138 No. 4, Aug. 1991.

Primary Examiner—Donald Hajec
Assistant Examiner—Thien Minh Le
Attorney, Agent, or Firm—Joan Pennington

[57] ABSTRACT

Apparatus and method for providing equalization adjustment for a filter are provided in a PRML data channel. A first predetermined test pattern is written. Relative error is measured in both magnitude and phase for predetermined frequencies. A relative magnitude ratio for the predetermined frequencies and a phase delay between the predetermined frequencies are identified. A tap set is generated having predefined frequency responses at a plurality of predefined discrete frequencies.

17 Claims, 7 Drawing Sheets

SELF-EQUALIZATION METHOD FOR PARTIAL-RESPONSE MAXIMUM-LIKELIHOOD DISK DRIVE SYSTEMS

BACKGROUND OF THE INVENTION

1. Field of the Invention

The present invention relates generally to a direct access storage device (DASD) of the type utilizing partial-response signaling and maximum-likelihood (PRML) detection together with digital filtering, and more particularly to apparatus and method for providing equalization adjustment for a filter in a PRML magnetic recording channel.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. A PRML channel can be used to achieve high data density in writing and reading digital data on the disks.

To obtain full advantage of the PRML channel, the received signal or the read signal must be passed through a specially designed equalizing filter which produces at its output a signal spectrum corresponding to the wave shape for which the maximum-likelihood detector is designed. When using digital filtering in a PRML system, the filter is located between an analog-to-digital converter (ADC) and other signal processing hardware which controls the system and performs the detection. Various equalizer adjustments have been implemented during data recovery in PRML to improve hard error rate.

U.S Pat. No. 5,258,940 issued Nov. 2, 1993 and assigned to the present assignee, discloses a distributed arithmetic (DA) digital filter having many taps, such as a ten 10-tap filter implemented in RAM. The disclosed DA digital filter is configured with an automatic equalization architecture that does not require an adaptive loop. A plurality of partial sums of predetermined tap weights are stored in a palette RAM. A fixed qualifier value is received and used together with selected ones of the stored partial sums for calculating a predetermined tap weight. Predetermined filter coefficients are calculated and stored in a filter RAM using the calculated predetermined tap weight and predefined ones of the stored partial sums.

U.S Pat. No. 5,268,848 issued Dec. 7, 1993 and assigned to the present assignee, discloses an apparatus and method for providing equalization adjustment for a finite impulse response (FIR) digital filter in a PRML data channel. A plurality of transformations are defined to transform effective tap weights in a digital filter into modified effective tap weight values by adding each initial effective tap weight value with a selected cosine equalization adjustment function. A cosine expander circuit is provided for expanding 8-byte compressed equalizations into a 32-byte format and for altering the filter response by a selected cosine equalization adjustment function.

Effective textbook solutions to the problem of equalization are available; however, these schemes do not lend themselves to a manufacturing environment because they require external hardware. Thus, a need exists to implement a robust equalization technique which uses available internal disk file hardware, with minimal test overhead on the manufacturing line. It is desirable to provide equalization algorithm that minimizes test time without compromising equalization integrity. An easily manufacturable method for finely tuned equalizations of a PRML channel to variations in magnetic components in a DASD is needed.

SUMMARY OF THE INVENTION

A principal object of the invention is to provide an improved equalization adjustment method and apparatus for a filter in a PRML magnetic recording channel in a disk file. Other objects are to provide such equalization adjustment method and apparatus substantially without negative effects and that overcome many of the disadvantages of prior art arrangements.

In brief, the objects and advantages of the present invention are achieved by apparatus and method for providing equalization adjustment for a filter in a PRML data channel. A first predetermined test pattern is written. Relative error is measured in both magnitude and phase for predetermined frequencies. A relative magnitude ratio for the predetermined frequencies and a phase delay between the predetermined frequencies are identified. A tap set is generated having predefined frequency responses at a plurality of predefined discrete frequencies.

BRIEF DESCRIPTION OF THE/DRAWING

The present invention together with the above and other objects and advantages may best be understood from the following detailed description of the embodiment of the invention illustrated in the drawing, wherein.

DETAILED DESCRIPTION OF THE PREFERRED EMBODIMENT

Figure 1:
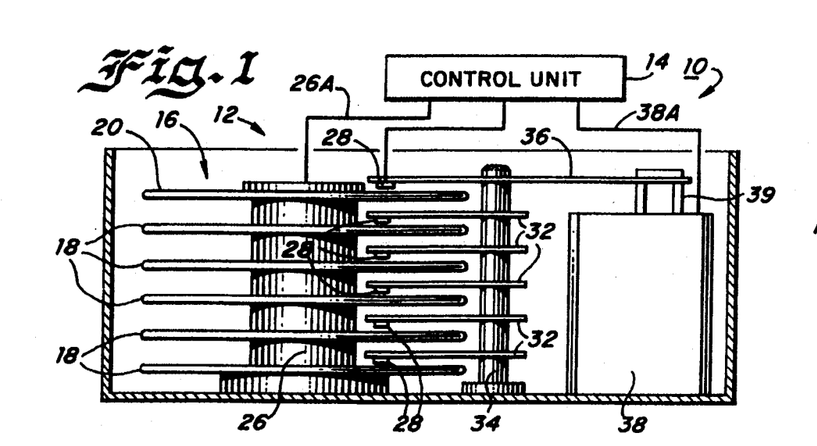
FIG. 1 is a schematic and block diagram of a data storage disk file embodying the present invention.

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other memory configurations may be used. Unit 12 is illustrated in simplified form sufficient for an understanding of the present invention because the utility of the present invention is not limited to the details of a particular drive unit construction.

Figure 2:
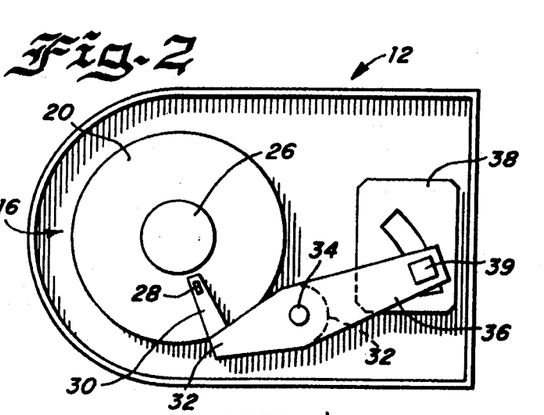
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor (VCM) 39 cooperating with a magnet and core assembly (not seen) operatively controlled for moving the transducer heads 28 in synchronism in a radial direction in order to position the heads in registration with data cylinders to be followed. The VCM 39 is movable within a fixed magnetic field, and the direction and velocity of the coil movement is controlled by the current supplied. During operation of the disk file 10, the various components of the disk file 10 are controlled in operation by signals generated by control unit 14 such as motor control signals on line 26A and position control signals on line 38A.

Figure 3:
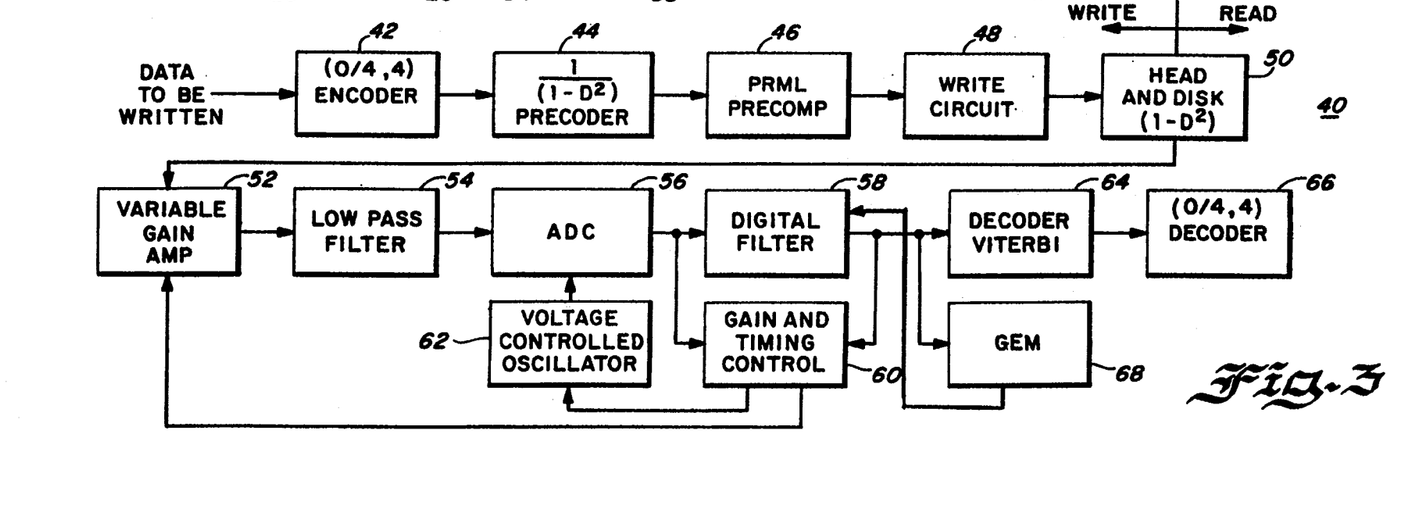
FIG. 3 is a block diagram illustrating a partial-response maximum-likelihood (PRML) channel in the data storage disk file of FIG. 1.

Referring now to FIG. 3, there is shown a block diagram of a partial-response maximum-likelihood (PRML) recording channel 40 available in the disk file 10 including a digital filter function of the invention. Data to be written is applied to an encoder 42 for providing a modulation coded output having predefined run length constraints, for example, such as, for the minimum and maximum number of consecutive zeros and the maximum run length of zeros in the even and odd recorded sequences in the overall recorded sequence. A precoder 44 follows the encoder 42 described by a $1/(1-D^2)$ operation where D is a unit delay operator. A PRML precomp 46 coupled to the precoder 44 provides a modulated binary pulse signal applied to a write circuit 48 that provides the modulated write current for writing to the disk surface. An analog read signal is obtained at head and disk block 50 described by the $(1-D^2)$ operation. The read signal is applied to a variable gain amplifier (VGA) 52 and the amplified read signal is applied to a lowpass filter 54. The filtered read signal is converted to digital form by an analog-to-digital converter (ADC) 56 that provides, for example, such as 64 possible 6-bit sampled values.

The samples of the ADC 56 are applied to a digital filter 58, such as a 10 tap finite impulse response (FIR) digital filter arranged in accordance with the invention, and are applied to a gain and timing control 60. The gain and timing control 60 provides a gain and control signal to the VGA 52 and provides a timing control signal to the ADC 56 via a voltage controlled oscillator 62. The filtered signal from the digital filter 58 is applied to a Viterbi decoder 64 coupled to a decoder 66 to complete the maximum-likelihood (ML) detection process for data read back.

Figure 8:
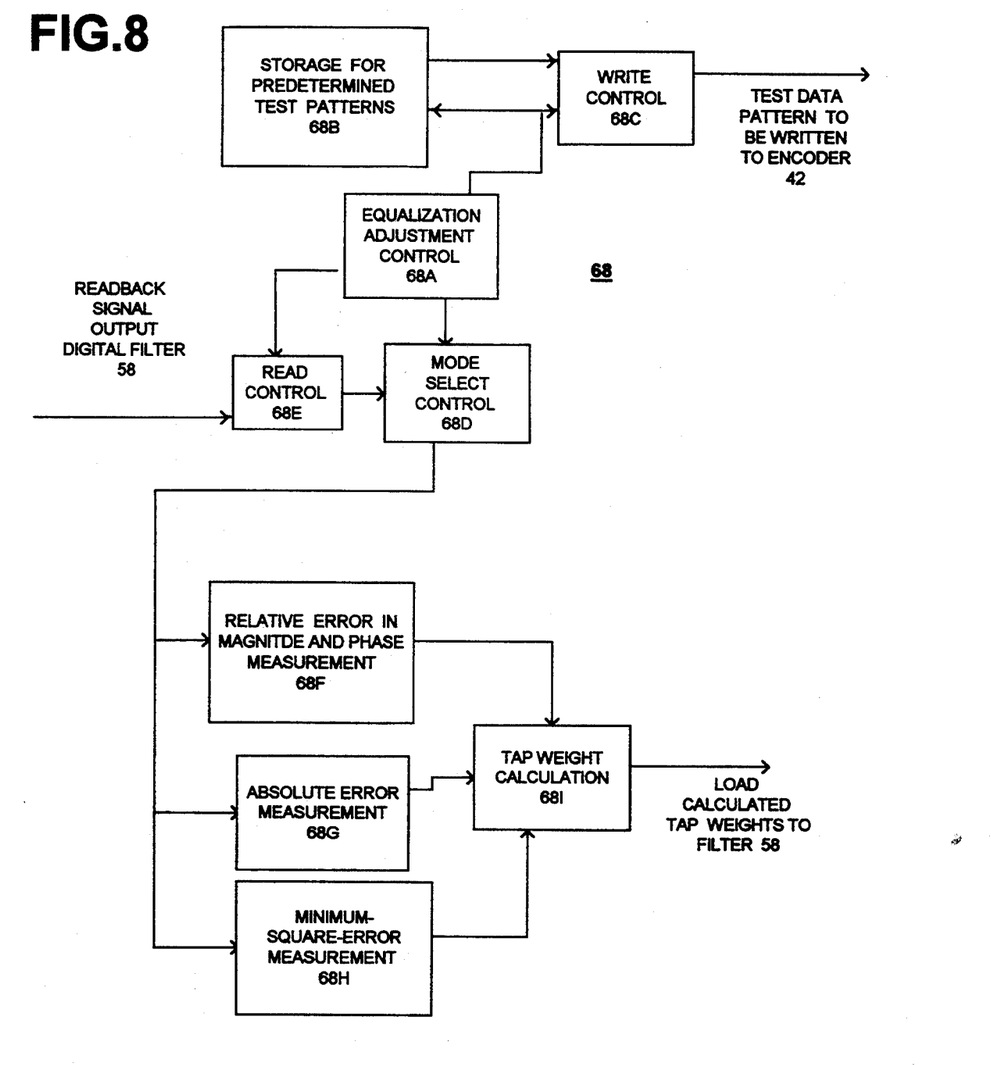
FIG. 8 is a block diagram representation of a generalized error measurement (GEM) circuit of FIG. 3.

A generalized error measurement (GEM) circuit 68 receives the filtered signal output of the digital filter 58. The GEM circuit 68 (FIG. 8) advantageously is used to implement an equalization adjustment method (EQUALIZATION ADJUSTMENT CONTROL 68A in FIG. 8) for generation and loading of tap weights for the FIR filter 58. Basic operations of the GEM circuit 68 include writing special data patterns on a sector of interest and selected error measurement operational modes, (MODE SELECT CONTROL 68D) for example, for measuring sample error, square of the sample error and mean-squared-error.

Figure 4:
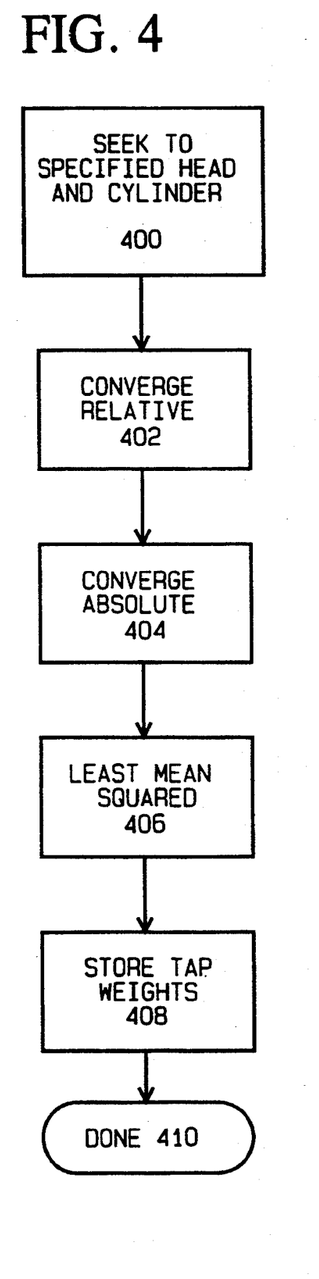
FIG. 4 is a flow chart illustrating sequential steps of an equalization adjustment method for a finite impulse response (FIR) digital filter in the PRML data channel in the data storage disk file of FIG. 1.

FIG. 4 illustrates the sequential operations of the GEM circuit 68 employed to carry out the equalization adjustment method for a filter of the invention. In accordance with the invention, an equalization adjustment method includes simple consecutive steps with constraints added at each step until the allowed degrees of freedom have been exhausted. While the equalization adjustment method is illustrated and described with respect to the FIR filter 58 of the PRML channel 40, it should be understood that the equalization adjustment method is applicable to other filters, both digital and analog filters.

In brief, the equalization adjustment method begins with a first predefined data test pattern (STORAGE FOR PREDETERMINED TEST PATTERNS 68B in FIG. 8) being written (WRITE CONTROL 68C IN FIG. 8) to the desired location. By using a first predefined simple test pattern which has few harmonics, the equalizer requirements are constrained at specific discrete frequencies. GEM measurements (RELATIVE ERROR IN MAGNITUDE AND PHASE MEASUREMENT 68F in FIG. 8) are taken to indicate the relative error in magnitude or resolution and phase or group delay at predetermined frequencies, for example, such as predefined harmonics of the first test pattern. Because the gain and timing loops are active during the relative error measurements, no absolute measures are possible. These measurements are taken by setting the GEM circuit 68 to a specific mode (68D), and then issuing a normal read operation. For the first part of the equalization adjustment method, the first test pattern written (68C) is purely periodic. A second predefined test pattern is written and an absolute error measurement (ABSOLUTE ERROR MEASUREMENT 68G in FIG. 8) step is performed. Then a random pattern is written (68C) in order to adequately excite the entire spectrum and the remaining degrees of freedom are constrained. For example, the remaining four degrees of freedom in the tap set are determined by a mean squared-error gradient search. In effect, the remaining degrees of freedom determine the best frequency response between the constrained discrete frequency points.

During all measurements, an equalizer which guarantees given frequency response at two discrete frequencies, for example, which are the harmonics of interest in the data pattern under test is required. In addition, the response at the sync field or two-length T pattern must obey the gain and phase constraints required by the PRML channel 40. A set of 6 tap weights is sufficient to realize these constraints for an NT/2 filter.

The equalization adjustment algorithm is adapted to converge on a proper NT/2 type filter. This constraint determines the delay of the filter at the sync field frequency. For NT filters, the delay is integral bit time units. For NT/2 filters, the delay is half-integral bit time units. An advantage of NT/2 filters includes more even distribution of overflow margin in the distributed arithmetic filter implementation. Unlike NT filters, NT/2 filters implement a notch at the Nyquist frequency. This can reduce the effects of read-back nonlinearity for many important patterns including the sync field pattern.

Since all filters exhibit the NT/2 characteristic, it is convenient to redefine the frequency response H(w) in terms of half-integral units of the bit time T:

$$H(w) = \sum_{n=0}^{9} t_n e^{jw(n-4.5)T} \tag{1}$$

Using this notation, the phase at the sync field is guaranteed to be 0 rather than $\pi/4$ in-more conventional notation. This notation allows easier normalization of phase errors, and makes the synthesis of tap sets which obey given constraints much easier. In effect, what has been done here is to "delay" the signal by half of a bit time. In the following, the value $T=1$ so that all time variables are in bit cell units.

The following procedure guarantees that the output tap set will have given frequency responses at 3 discrete frequencies, or:

$$H(w_1) = h_{1r} + jh_{1i} \tag{2}$$

$$H(w_1) = h_{2r} + jh_{2i} \tag{3}$$

$$H(\pi/2) = 1 + j0 \tag{4}$$

The above equation (4) constrains the frequency response at the sync frequency, which is required for smooth transitions between the acquisition and tracking modes in the gain and timing loops.

Thus, the four input variables $h_{1r}$, $h_{1j}$, $h_{2r}$ and $h_{2j}$, along with the auxiliary parameters $w_1$ and $w_2$, can be satisfied with 6 tap weights. Where test conditions indicate further constraints are necessary, for example, to notch out harmonics due to nonlinearity or aliasing, 2 more discrete frequency points can be exactly synthesized.

These equations can be explicitly solved for a set of 6 tap weights, although many intermediate variables are required. By exploiting even and odd symmetries, it is possible to transform the 6 equations into 2 independent sets of 3 equations: one set involving the real parts of the constraints, and cosine functions of the input frequencies; and the other set involving the imaginary parts of the constraints, and sine functions of the input frequencies. Then, these systems contain enough symmetry to make solve the transformed variables quite easily. Finally, the results are retransformed to give the set of 6 tap weights. While these equations apply to NT/2 filters, it should be understood that the equalization adjustment method of the invention is not limited to NT/2 filters.

A signed measure of the magnitude error is $\delta_m = f(1.5) - f(2.5)$ and a signed measure of the phase error $\delta_p = f(1.5) + f(2.5)$, where the function f is defined:

$$f(t) = A\cos(\pi t/4 + \phi_1) + B\cos(3\pi t/4 + \phi_2) \tag{4A}$$

This data pattern has one harmonic that is one-half the sync field frequency and another harmonic at three-halfs the sync field frequency. Important properties of this pattern include first-order orthogonality in the measurements of $\delta_m$ and $\delta_p$, and insensitivity to quadratic MR sensor nonlinearities. The pattern avoids precomp sensitivity because it is written with 4-length magnets and minimizes non-linear bit shift problems of short magnets. The pattern has only 2 frequency elements in the passband of the channel. The gain and timing loops enforce the following constraints:

$$f(-0.5) + f(0.5) = 4 \tag{5}$$

$$f(-1.5) + f(-0.5) - f(0.5) - f(1.5) = 0 \tag{6}$$

Corrections are defined by:

$$\text{Ratiocorrection} = \frac{\alpha_0 + \alpha_1 \delta_m}{\beta_0 + \beta_1 \delta_m} \tag{7}$$

$$\sin(\phi_1) = \sigma_0 \delta_p \tag{8}$$

$$\sin(\phi_2) = \sigma_1 \sin(\phi_1) \text{tm} \tag{9}$$

where the numbers $\phi_1$, $\phi_2$ generate a group delay correction. In converge relative step of FIG. 5, $p_1$ and $p_2$ are computed from ▲DELAY before calling the routine to calculate the taps and load the FIR filter. Assuming small group delay so that $\phi_1 \approx \sin(\phi 1)$ and $\phi_2 = \sin(\phi 2)$, thus $\phi_1 = P_1 = \sigma_0 \delta_p = k_1 *$▲DELAY, $\phi_2 = p_2 = \rho_1 \rho_0 \delta_p = k_2 *$▲DELAY. $\phi_1 = p_1$ and $\phi_2 = p_2$ where these are measurements of the group delay of the first and third harmonic of 4L pattern. Using these measurements, a new tap set is generated with the desired frequency response at the frequencies of interest.

FIG. 4 is a flow chart illustrating sequential steps of the equalization adjustment method. First as indicated at a block 400, the sequential operations start with a seek to specified head and cylinder. Next as indicated at a block 402, a converge relative step is performed, as illustrated and described with respect to FIG. 5. Then as indicated at a block 404 a converge absolute step is performed, as illustrated and described with respect to FIGS. 6A and 6B. Next as indicated at a block 406 a least-mean-squared (LMS) step (68D) is performed, as illustrated and described with respect to FIGS. 7A and 7B. Then as indicated at a block 408, the tap weights are stored to complete the sequential steps at a block 410.

Figure 5:
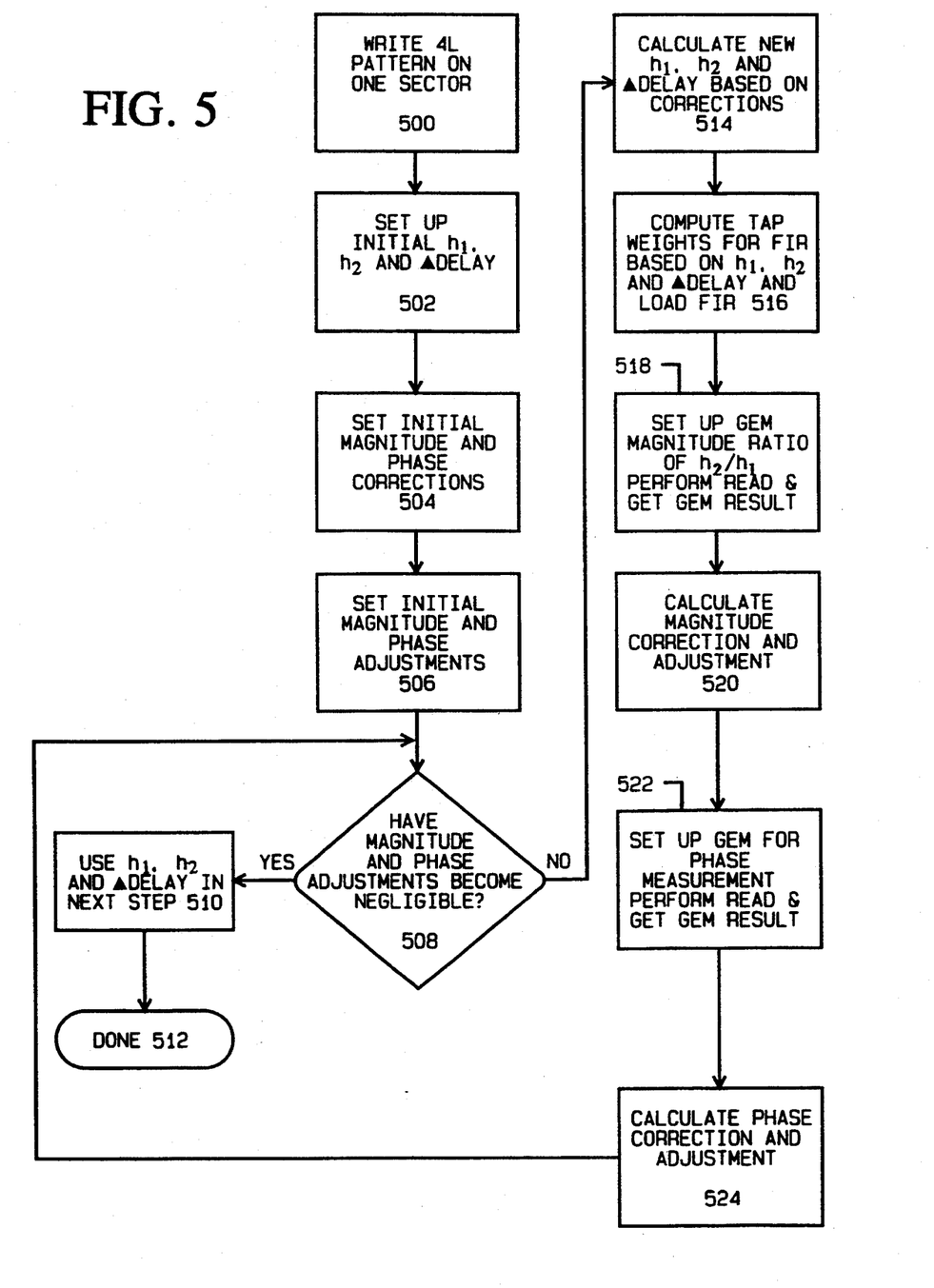
FIG. 5 is a flow chart illustrating sequential steps for a relative error measurement step of the equalization adjustment method of FIG. 4.

FIG. 5 illustrates a converge relative step. While it is possible to converge in one set of measurements, for a particular pattern, an iterative approach is superior, because of various nonlinearities, including MR asymmetry, write nonlinearities, and timing and gain-loop clamping during tracking mode. Typically, these loops converge to negligible error within 4 or 5 steps. At the end of this step, the magnitude ratio of the harmonics is known, and the difference in group delay between the harmonics is known, for the particular sampling phase.

Sequential operations begin at a block 500 with writing (68C) a four-length data pattern (68B) or 4L pattern (1100 repeated) on one sector defined as the test location. Next the initial settings $h_1$, $h_2$ and ▲DELAY are set up for the frequency response of the FIR filter 58 as indicated at a block 502, where $h_1$ and $h_2$ are the magnitudes at the 2 harmonic frequencies and ▲DELAY is the phase delta of the 2 harmonic frequencies defined by the above equations 2 and 3. Next initial magnitude and phase corrections are set at block 504. Then initial magnitude and phase adjustments are set at block 506. Then it is determined whether magnitude and phase adjustments have become negligible as indicated at a decision block 508. When magnitude and phase adjustments have become negligible, then $h^1$, $h_2$ and DELAY are used in next step as indicated at a block 510. Then the relative converge step is completed as indicated at a block 512.

Otherwise when the magnitude and phase adjustments have not become negligible, then new $h_1$, $h_2$ and ▲ DELAY are calculated based on corrections at a block 514. Tap weights for the FIR filter based on $h_1$, $h_2$ and ▲ DELAY are computed and loaded in the FIR filter 58 at a block 516. Then GEM 68 is set up for relative magnitude (ratio of $h_2/h_1$) measurement (68F) at a block 518, a read of 4L pattern is performed and the GEM result is obtained. Next at a block 520 the magnitude correction and adjustment are calculated. GEM 68 is set (68D) for relative phase measurement, a read (READ CONTROL 68E in FIG. 8) of 4L pattern is performed and the GEM result is obtained at a block 522. Then phase correction and adjustment are calculated at a block 524. The sequential operations (68A) return to block 508 until negligible magnitude and phase adjustments are identified.

Figure 6A:
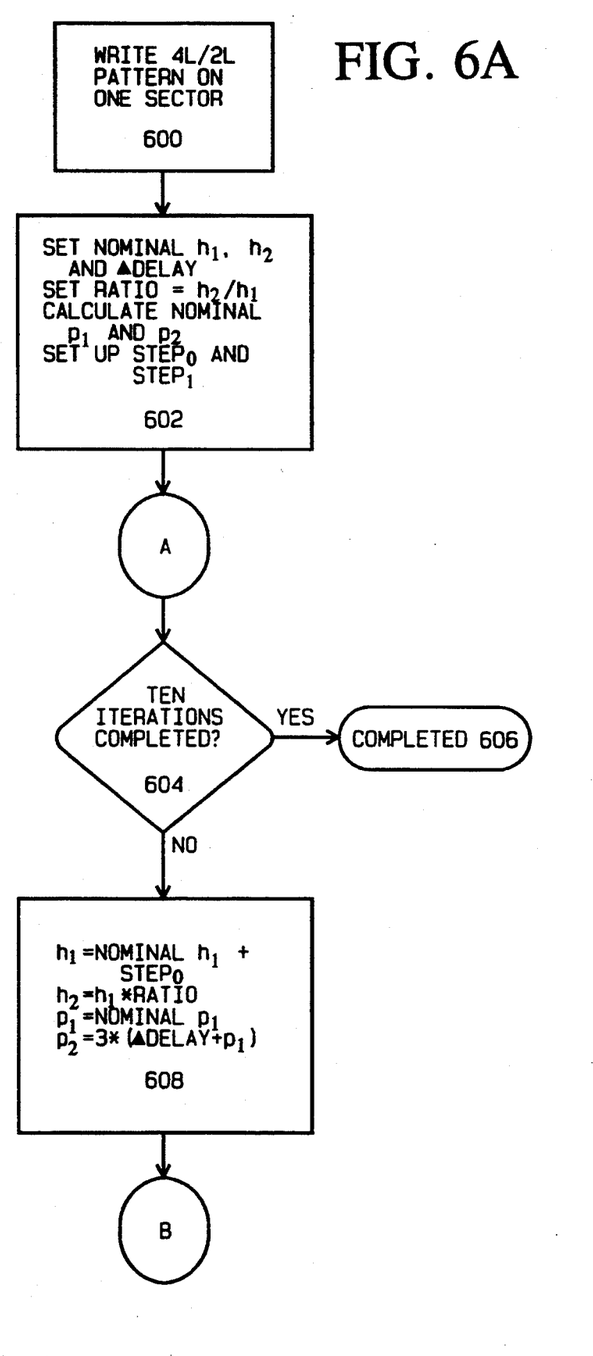
FIGS. 6A and 6B provide a flow chart illustrating sequential steps for an absolute error measurement step of the equalization adjustment method of FIG. 4.
Figure 6B:
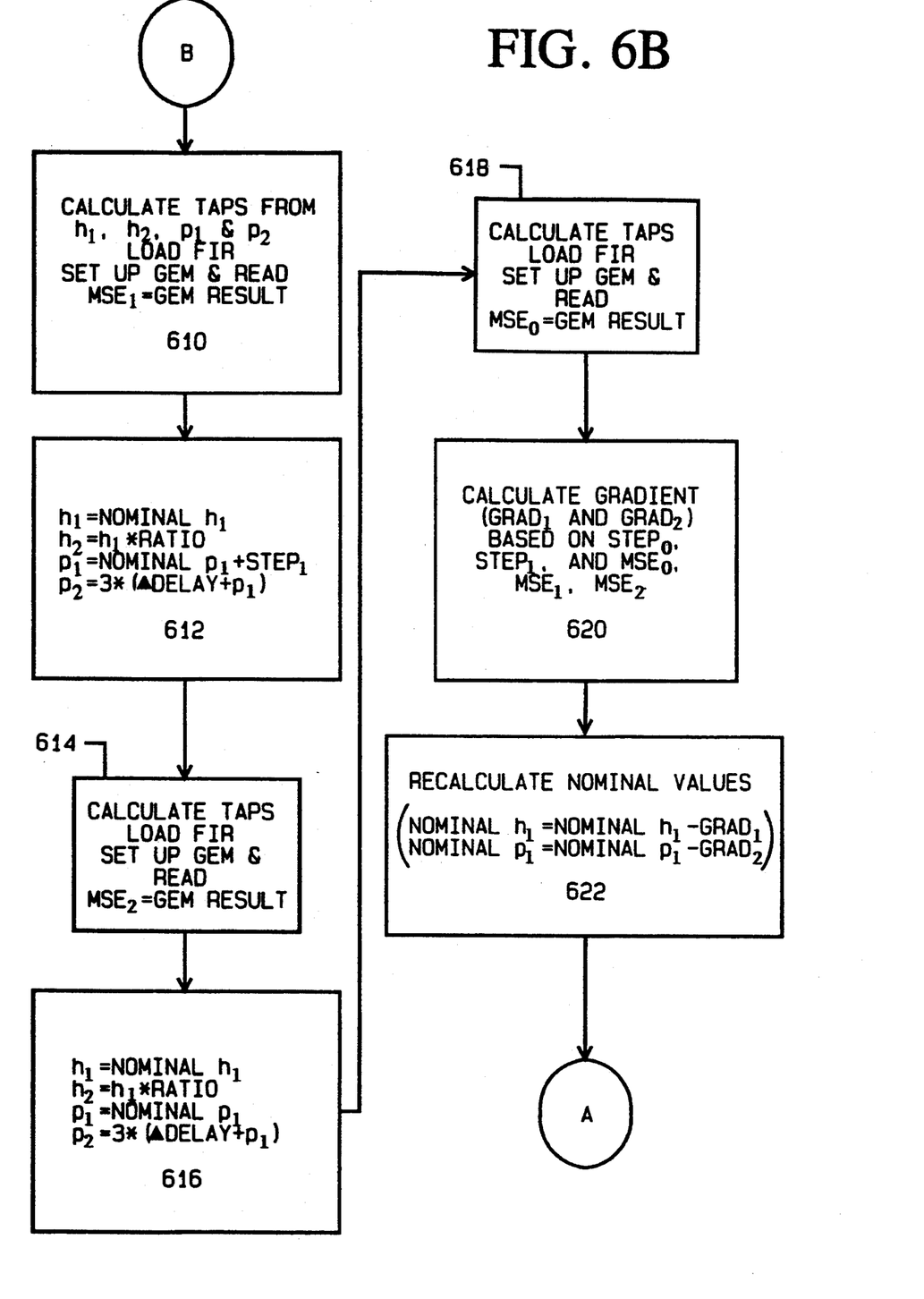

FIGS. 6A and 6B illustrate an absolute measurement step where required gain and phase are measured. In this step, the repetitive data pattern is interrupted by bursts of sync field or the 2-length "T" pattern. Absolute measurements (68G) are determined by minimizing the squared-error from GEM circuit 68 over possible values of the frequency responses of the filter 58 which obey the relative magnitude constraints generated in the first step. The mean squared-error (MSE) (MINIMUM-SQUARE-ERROR 68H in FIG. 8) measures the effects of transients in the gain loop between the pure pattern and sync field for absolute magnitude convergence. The MSE measures the effects of would-be transients in the timing loop between the pure pattern and sync field for absolute phase measurements. The phase responses at the two harmonics present in the periodic test pattern are allowed to float freely during the absolute step. The minimum MSE, found over two degrees of freedom, is found by standard gradient search techniques. These degrees of freedom are the magnitude and phase response at the first harmonic. The magnitude and phase response of the third harmonic is constrained to be related to that of the first harmonic by the information provided in the relative step. In this way, the output equalizer is constrained in a heuristic sense to have the right magnitude and phase characteristics at 3 equi-spaced frequencies within the data band.

Referring to FIGS. 6A and 6B, the absolute measurement step begins with writing 4L/2L pattern on one sector as indicated at block 600. Next at block 602, the nominal $h_1$, $h_2$ and ▲ DELAY values calculated in converge relative of FIG. 5 are set and the ratio=$h_2/h_1$ is set, nominal $P_1$ and $P_2$ are calculated from the ▲ DELAY phase at two frequencies and $step_0$ and $step_1$ are set up to predefined values. The ratio $h_2/h_1$ does not change in this absolute measurement converge step. At a decision block 604, it is determined whether ten iterations have been completed. If yes, then the absolute measurement step is completed as indicated at block 606. Otherwise when ten iterations have been not completed, then variables are identified by $h_1$=nominal $h_1$ and $STEP_0$, $h_2$=$h_1$*ratio, $p_1$=NOMINAL $p_1$, $p_2$=3*(▲DELAY+$p_1$) at a block 608. Then the tap weight (68I) are calculated from $h_1$, $h_2$, $p_1$ & $p_2$ and the FIR 58 is loaded, the GEM 68 is set up for MSE measurement (68G in FIG. 8) and the 4L/2L pattern is read (68E) and the GEM result is obtained, where $MSE_1$=-GEM result at a block 610. Next variables are updated by $h_1$=NOMINAL $h_1$, $h_2$=$h_1$*RATIO, $P_1$=NOMINAL $P_1$+$step_1$, $p_2$=3*(▲ DELAY+$p_1$) at a block 612. Then at a block 614 updated tap weight (68I) are calculated and loaded to the FIR 58, the GEM 68 is set up for MSE measurement (68I) and the 4L/2L data pattern is read (68E) and the GEM result is obtained, where $MSE_2$=GEM result. Variables are updated at block 616 $h_1$=NOMINAL $h_1$, $h_2$=$h_1$*RATIO, $p_1$=NOMINAL $p_1$, $p_2$=3*(▲ DELAY+$p_1$). Then at a block 618 updated taps are calculated and loaded to the FIR 58, the GEM 68 is set up for MSE measurement and a read is performed and the GEM result is obtained, where $MSE_0$=GEM result. Next gradient ($grad_1$ and $grad_2$) are calculated based on $STEP_0$, $STEP_1$ and $MSE_0$, $MSE_1$, $MSE_2$. Then at a block 622, nominal values are recalculated (NOMINAL $h_1$=NOMINAL $h_1$−$GRAD_1$) (NOMINAL $P_1$=NOMINAL $P_1$−$GRAD_2$). The sequential operations return to block 604 until ten completed iterations are identified. It should be understood that convergence can be determined in various other ways than identifying ten completed iterations as shown in block 604.

At the end of this first part, the real and imaginary parts of the required frequency response are known at three discrete frequencies: the first and third harmonics of the 1100 pattern and the sync field frequency. This places 6 constraints on the 10-dimensional surface allowed for the tap weights. A four dimensional gradient search on the remaining degrees of freedom completes the equalization.

Basically, the first two relative and absolute steps of FIGS. 5 and 6A, 6B fixed the frequency response for the first and third harmonic of the 4L pattern. The response at sync field (2L) is fixed due to gain and timing constraints. Thus the LMS step searches for the best choice of the filter, based on the constraints listed above, by manipulating the remaining four degrees of freedom. Six degrees are fixed because we have fixed the phase and magnitude response of three frequencies. There are ten degrees of freedom total since we have ten tap weights.

Figure 7A:
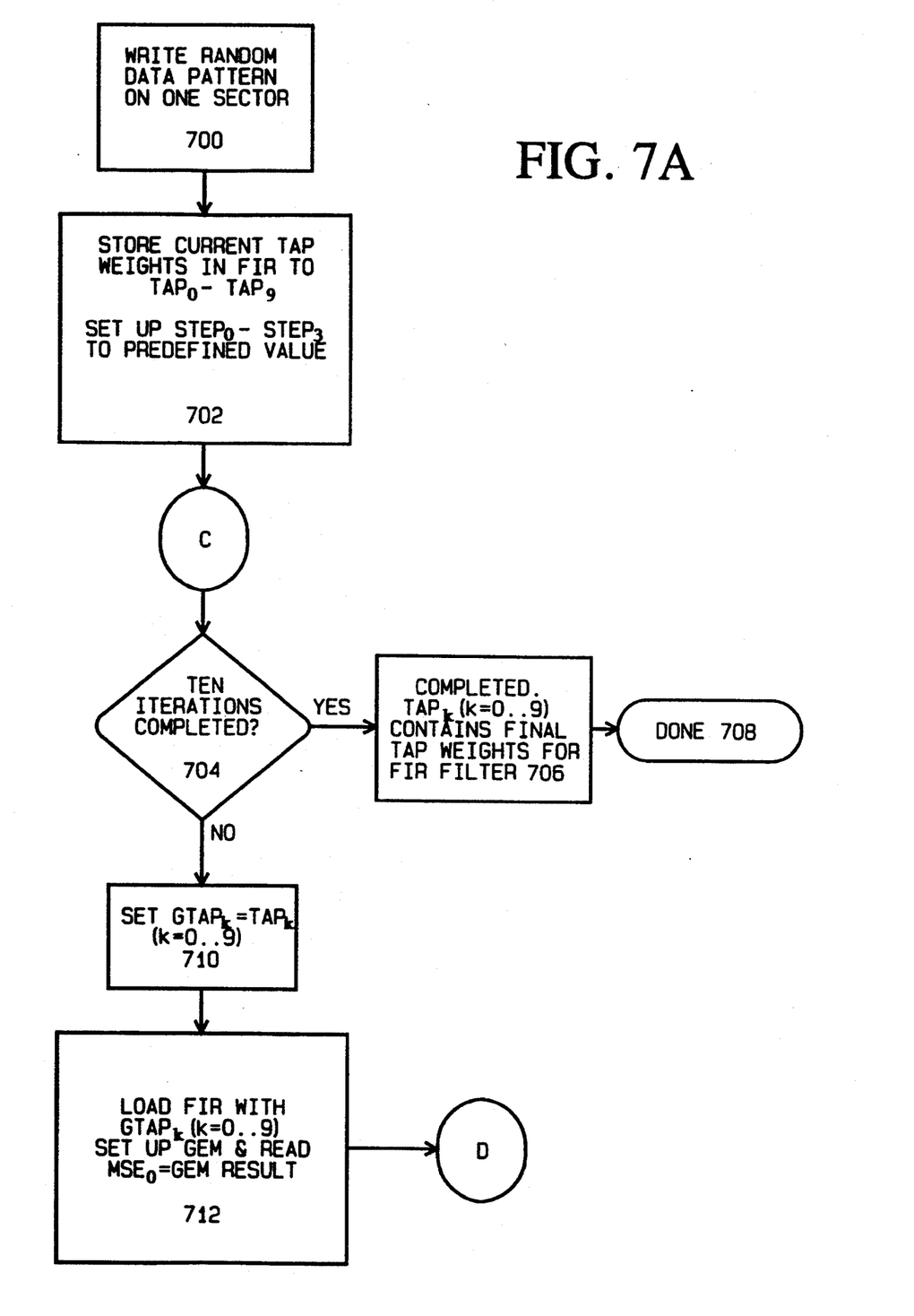
FIGS. 7A and 7B provide a flow chart illustrating sequential steps for a least-mean-squared (LMS) error measurement step of the equalization adjustment method of FIG. 4.
Figure 7B:
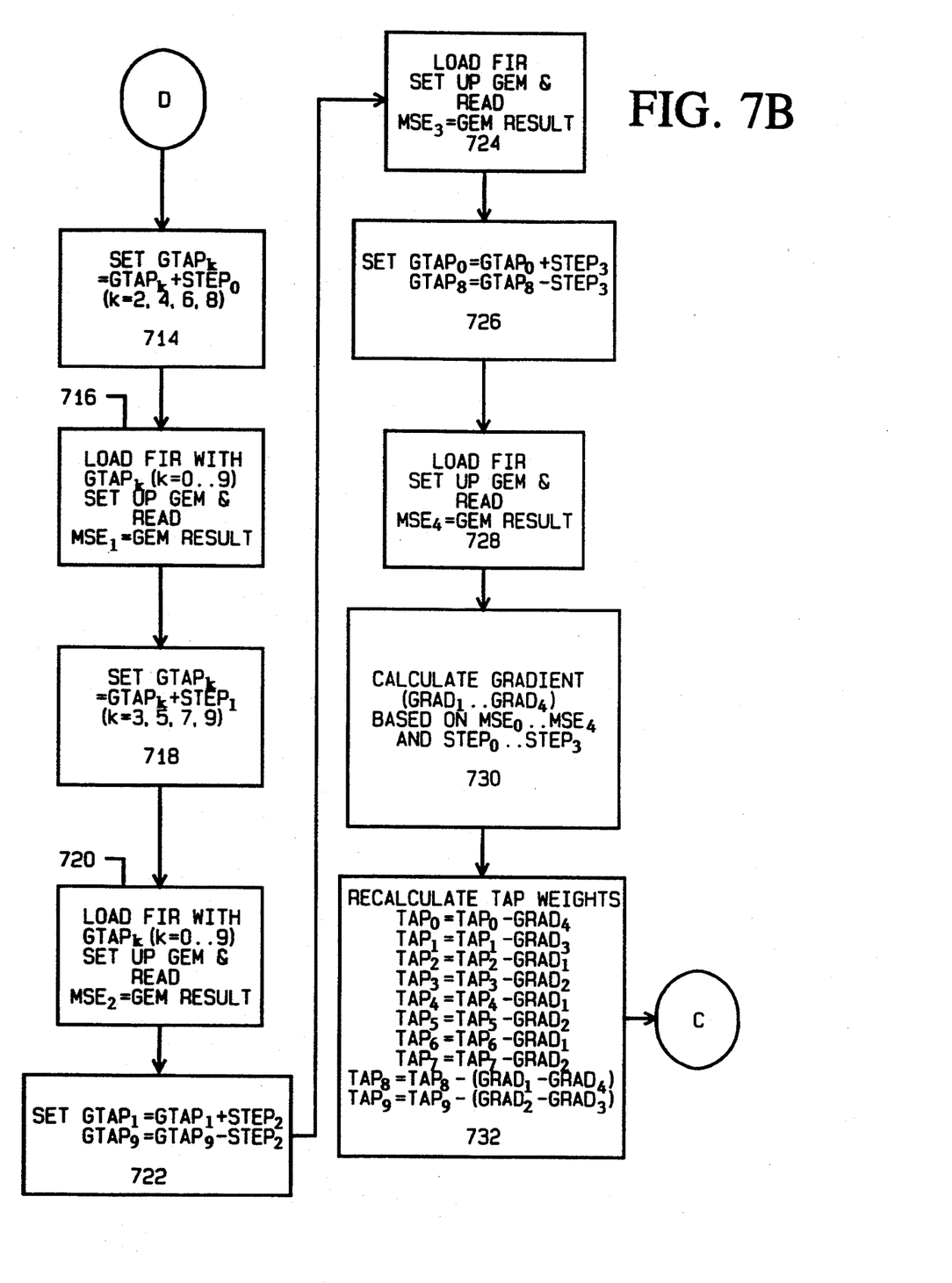

FIGS. 7A and 7B illustrate sequential steps for the least-mean-squared (LMS) error measurement step of the equalization adjustment method. The LMS step (68A) begins at a block 700 with writing random data pattern on one sector. Then the current tap weights are stored in FIR 58 to $tap_0$-$tap_9$ and $step_0$-$step_3$ are set up to a predefined value at a block 702. At a decision block 704, it is determined whether ten iterations have been completed. If yes, then the sequential steps are completed and $tap_k$ (k=0..9) contains the final tap weights for FIR filter 58 as indicated at block 706. Then the LMS step (68A) is completed as indicated at a block 708.

Otherwise when ten iterations have not been completed then at a block 710, set $gtap_k$=$tap_k$ (k=0..9). The FIR 58 is loaded with the $gtap_k$ (k=0..9), the GEM 68 is set (68D) for MSE measurement and then a read is performed and the GEM result is obtained, $MSE_0$=-GEM result at a block 712. Next at a block 714, set $gtap_k$=$gtap_k$+$step_0$ (k=2,4,6,8). Then at a block 716, the FIR 58 is loaded with the $gtap_k$ (k=0..9), the GEM 68 is set (68D) for MSE measurement, (68H) the random data pattern is read (68F), and the GEM result obtained, where $MSE_1$=GEM RESULT. Then a block 718, set $GTAP_K$=$GTAP_K$+$STEP_1$ (k=3,5,7,9). Then at a block 720, the FIR 58 is loaded with the gtap$_k$ (k=0..9), the GEM 68 is set (68D) for MSE measurement (68H), the random data pattern is read (68E), and the GEM result obtained, where MSE$_2$=GEM RESULT. Next at block 722, set gtap$_1$=gtap$_1$+step$_2$, and gtap$_9$=gtap$_9$=step$_2$. Then at a block 724, the FIR 58 is loaded with the gtap$_k$(k=0..9), the GEM 68 is set (68D) for MSE measurement (68H), the random data pattern is read (68E), and the GEM result obtained, where MSE$_3$=GEM RESULT. Then at a block 726, set GTAP$_0$=GTAP$_0$+STEP$_3$ and GTAP$_8$=GTAP$_8$−STEP$_3$. Then at a block 728, the FIR 58 is loaded with the gtap$_k$ (k=0..9), the GEM 68 is set (68D) for MSE measurement, the random data pattern is read, and the GEM result obtained, where MSE$_4$=GEM RESULT. Next at a block 730, GRADIENT (GRAD$_1$... GRAD$_4$) are calculated based on MSE$_0$.. MSE$_4$ and STEP$_0$.. STEP$_3$. Finally the tap weights (68I) are recalculated at a block 732, where TAP$_0$=TAP$_0$ GRAD$_4$, TAP$_1$=TAP$_1$−GRAD$_3$, TAP$_2$=TAP$_2$−GRAD$_1$, TAP$_3$=TAP$_3$−GRAD$_2$, TAP$_4$=TAP$_4$−GRAD$_1$, TAP$_5$=TAP$_5$−GRAD$_2$, TAP$_6$=TAP$_6$−GRAD$_1$, TAP$_7$=TAP$_7$−GRAD$_2$, TAP$_8$=TAP$_8$−(GRAD$_1$−GRAD$_4$), TAP$_9$=TAP$_9$−(GRAD$_2$−GRAD$_3$). The sequential operations return to block 704 until ten completed iterations are identified.

A routine to generate the ten Lap weights (68I) tap$_0$.. tap$_9$ for the FIR filter 58 based on h1, h2, p1 and p2 for use in converge relative and converge absolute follows.

h1r=h1,cos (p1)
h1i=h1,sin (p1),
   where h1r & h1i are the real and imaginary components of the complex filter response at the first harmonic of the 4L pattern, and represents both magnitude and phase.
h2r=h2*cos(p2)
h2i=h2,in(p2),
   where h2r & h2i are the real and imaginary components of the complex filter response at the third harmonic of the 4L pattern.

b$\phi$=h1r−$\sqrt{2}$*cos($\pi$/8)
b1=h2r−$\sqrt{2}$*cos(3$\pi$/8)

Real and imaginary matrix are defined by:

ar$_{00}$=cos($\pi$/8)+cos(3$\pi$/8)+sin(5*$\pi$/8)   ai$_{00}$=sin($\pi$/8)−+sin(5*$\pi$/8)

ar$_{10}$=cos(3*$\pi$/8)+cos(3*3$\pi$/8)+sin(5*$\pi$/8))   ai$_{10}$=sin(3*$\pi$/8)− ar$_{01}$=cos(3$\pi$/8)+cos(5*$\pi$/8)+sin(5*3$\pi$/8)   ai$_{01}$=sin(3*$\pi$/8)− ar$_{11}$=cos(3$\pi$/8)+cos(5*$\pi$/8)+sin(5*3$\pi$/8)   ai$_{11}$=sin(3*3$\pi$/8)−

Real and imaginary determinants are defined by:

detr=ar$_{00}$*ar$_{11}$−ar$_{01}$*ar$_{10}$   deti$_{10}$=ai$_{00}$,ai$_{11}$−ai$_{01}$*ai$_{10}$ Real and imaginary transformation are defined by:

$$t2r = \frac{b\phi*ar_{11} - b1*ar_{01}}{detr}$$

$$t1i = \frac{h1i*ai_{11} - h2i*ai_{01}}{deti}$$

$$t3r = \frac{b1*ar_{00} - b\phi*ar_{10}}{detr}$$

$$t2i = \frac{h2i*ai_{00} - h1i*ai_{10}}{deti}$$

t1r=t2r+t3r+$\sqrt{2}$
t3i=t1i+t2i

The tap set tap$_0$−tap$_9$ are defined by:

tap$_0$=0   tap$_5$=½(t1r−t1i)
tap$_1$=0   tap$_6$=½(t2r−t2i)
tap$_2$=½(t3r+t3i)   tap$_7$=½(t3r−t3i)
tap$_3$=½(t2r+t2i)   tap$_8$=0
tap$_4$=½(t1r+t1i)   tap$_9$=0

Gradient calculation for converge absolute is defined by:

$\mu = 5 * 10^{-7}$   STEP$_0$ = 0.01   STEP$_1$ = 0.01

$$grad_1 = \frac{\mu(MSE_1 - MSE_0)}{STEP_0}$$

$$grad_2 = \frac{\mu(MSE_2 - MSE_0)}{STEP_1}$$

Gradient calculation for LMS step is defined by:

STEP$_0$ = STEP$_1$ = STEP$_2$ = STEP$_3$ = 0.015
$\mu = 3 * 10^{-7}$ $$grad_1 = \frac{\mu(MSE_1 - MSE_0)}{STEP_0}$$

$$grad_2 = \frac{\mu(MSE_2 - MSE_0)}{STEP_1}$$

$$grad_3 = \frac{\mu(MSE_3 - MSE_0)}{STEP_2}$$

$$grad_4 = \frac{\mu(MSE_4 - MSE_0)}{STEP_3}$$

While the invention has been described with reference to details of the illustrated embodiment, these details are not intended to limit the scope of the invention as defined in the appended claims.

What is claimed and desired to be secured by Letters Patent of the United States is:

1. Apparatus for providing equalization adjustment for a filter comprising:
   means for writing a selected one of first, second and third predetermined test patterns;
   means for reading a selected one of said first, second and third predetermined test patterns
   means responsive to reading said first predetermined test pattern for measuring relative error in magnitude and phase for predetermined frequencies;
   means responsive to reading said second predetermined test pattern for measuring absolute error in magnitude and phase for predetermined frequencies;
   means responsive to reading said third predetermined test pattern for measuring a measuring minimum-squared-error result; and
   means for calculating tap weights for equalization adjustment of the filter.

2. Apparatus as recited in claim 1 wherein said predetermined frequencies include predetermined harmonic frequencies of said first predetermined test pattern.

3. Apparatus as recited in claim 1 wherein said second predetermined test pattern includes said first predetermined test pattern with a sync field pattern.

4. Apparatus as recited in claim 3 wherein said first predetermined test pattern is a four-length pattern 1100 repeated.

5. Apparatus as recited in claim 4 wherein said sync field pattern is a two-length pattern 11-1-1 repeated.

6. Apparatus as recited in claim 1 wherein said third predetermined test pattern includes a random data pattern written to a predefined test sector.

7. Apparatus as recited in claim 1 wherein said tap weights equals 10 and further includes a predetermined partial set of tap weights includes 6 tap weights.

8. Apparatus as recited in claim 1 wherein said first predetermined test pattern is a four-length pattern represented by: $f(t) = A \cos(\pi t/4 + \phi_1) + B \cos(3\pi t/4 + \phi_2)$, where $\phi_1$ and $\phi_2$ represent group delay correction values for the first and third harmonic frequencies of said first predetermined test pattern.

9. Apparatus as recited in claim 8 wherein said first predetermined test pattern includes one harmonic that is one-half of a sync field frequency and another harmonic that is three-halfs the sync field frequency.

10. Apparatus as recited in claim 1 wherein said filter is a finite impulse response (FIR) digital filter used in a partial-response maximum likelihood (PRML) data channel in a disk file and wherein said first predetermined test pattern includes two frequency elements in the passband of said PRML data channel.

11. A method for providing equalization adjustment of a filter comprising the steps of:
   writing a first predetermined test pattern;
   reading said first predetermined test pattern and identifying a predefined frequency response for said first predetermined test pattern;
   writing a second predetermined test pattern;
   reading said second predetermined test pattern and identifying a predefined frequency response for said second predetermined test pattern; and
   generating responsive to said identified frequency response for said first predetermined test pattern and said identified frequency response for said second predetermined test pattern, a tap set having predefined frequency responses at a plurality of predefined discrete frequencies.

12. A method as recited in claim 11 wherein said step of reading said first predetermined test pattern and identifying a predefined frequency response for said first predetermined test pattern includes the steps of:
   measuring relative error in magnitude and group delay for predetermined harmonic frequencies of said first predetermined test pattern; and
   identifying a relative magnitude ratio for said predetermined harmonic frequencies and identifying a phase delay between said predetermined harmonic frequencies.

13. A method as recited in claim 11 wherein said step of writing a first predetermined test pattern includes the steps of writing a four-length pattern represented by:

$f(t) = A \cos(\pi t/4 + \phi_1) + B \cos(3\pi t/4 + \phi_2)$, where $\phi_1$ and $\phi_2$ represent group delay correction values for the first and third harmonic frequencies of said first predetermined test pattern.

14. A method as recited in claim 12 wherein said step of generating a tap set having predefined frequency responses at a plurality discrete frequencies includes the steps of utilizing said identified relative magnitude ratio and said identified group delay for an absolute error measurement step.

15. A method as recited in claim 14 wherein said step of generating a tap set having predefined frequency responses at a plurality discrete frequencies includes the steps of identifying mean-squared error (MSE) minimizations for said absolute error measurement step.

16. A direct access storage device of the type including a partial-response maximum-likelihood (PRML) data channel comprising:
   a housing;
   at least one disk mounted in said housing for rotation about an axis and having at least one disk surface for storing data;
   transducer means mounted for movement across said disk surface for reading and writing data to said disk surface;
   a finite impulse response (FIR) digital filter in said PRML data channel coupled to said transducer means for filtering digital sample values,
   means for providing equalization adjustment of said finite impulse response FIR digital filter including;
   means for writing a first predetermined test pattern;
   means for reading said first predetermined test pattern
   means for measuring relative error in magnitude and phase for predetermined harmonic frequencies of said first predetermined test pattern; and
   means for generating a tap set having predefined frequency responses at a plurality of predefined discrete frequencies.

17. A direct access storage device of the type including a partial-response maximum-likelihood (PRML) data channel as recited in claim 16 wherein said means for generating a tap set include means for minimizing squared-error gain and phase values for said predetermined harmonic frequencies.

* * * * *